US011883854B2

(12) United States Patent
Doi

(10) Patent No.: US 11,883,854 B2
(45) Date of Patent: Jan. 30, 2024

(54) OPTICAL SORTER

(71) Applicant: SATAKE CORPORATION, Tokyo (JP)

(72) Inventor: Takahiro Doi, Tokyo (JP)

(73) Assignee: SATAKE CORPORATION, Tokyo (JP)

( * ) Notice: Subject to any disclaimer, the term of this patent is extended or adjusted under 35 U.S.C. 154(b) by 15 days.

(21) Appl. No.: 17/799,014

(22) PCT Filed: Feb. 26, 2021

(86) PCT No.: PCT/JP2021/007376
§ 371 (c)(1),
(2) Date: Aug. 11, 2022

(87) PCT Pub. No.: WO2021/177173
PCT Pub. Date: Sep. 10, 2021

(65) Prior Publication Data
US 2023/0067478 A1 Mar. 2, 2023

(30) Foreign Application Priority Data

Mar. 5, 2020 (JP) ................................ 2020-038196

(51) Int. Cl.
*B07C 5/342* (2006.01)
*G01N 21/25* (2006.01)
(Continued)

(52) U.S. Cl.
CPC ......... *B07C 5/3425* (2013.01); *G01N 21/251* (2013.01); *G01P 3/38* (2013.01); *G01N 2021/8592* (2013.01)

(58) Field of Classification Search
CPC ..... B07C 5/3422; B07C 5/3425; B07C 5/366; B07C 5/342; B07C 2501/00;
(Continued)

(56) References Cited

U.S. PATENT DOCUMENTS 4,426,005 A * 1/1984 Satake .................... B07C 5/366
209/581
4,630,736 A * 12/1986 Maughan ................ B07C 5/366
209/587
(Continued)

FOREIGN PATENT DOCUMENTS

CN 110090818 A * 8/2019 ............. B07C 5/342
EP 1083007 A2 * 3/2001 ........... B07C 5/3425
(Continued)

OTHER PUBLICATIONS

International Search Report corresponding to International Application No. PCT/JP2021/007376 dated May 11, 2021, in English.
(Continued)

*Primary Examiner* — Gene O Crawford
*Assistant Examiner* — Muhammad Awais
(74) *Attorney, Agent, or Firm* — Renner, Otto, Boisselle & Sklar, LLP

(57) ABSTRACT

An optical sorter includes a light source, a color sensor, a determination part configured to determine a foreign object and/or a defective product, a color shift amount calculation part configured to calculate, based on a color image acquired by the color sensor, an amount of a color shift that occurs due to the fact that at least two element groups out of an R element group, a G element group, and a B element group are spaced apart from each other in a transit direction of a sorting target, a speed calculation part configured to calculate a transit speed of the sorting target based on a separation distance between the at least two element groups in the transit direction, the color shift amount, and a scan time, which is a time required for the color sensor to scan the sorting target once, and a sorting device configured to perform a trajectory change operation for changing a trajectory of a specific sorting target determined based on a result of the determination by the determination part at a
(Continued)

timing determined based on the transit speed calculated by the speed calculation part.

9 Claims, 6 Drawing Sheets

(51) Int. Cl.
*G01P 3/38* (2006.01)
*G01N 21/85* (2006.01)

(58) Field of Classification Search
CPC ... B07C 2501/0018; B07C 5/36; B07C 5/361; B07C 5/363; B07C 5/365; B07C 5/368; G01N 21/251; G01N 2021/8592; G01N 21/85; G01P 3/38
USPC .................................................. 209/44, 580
See application file for complete search history.

(56) References Cited

U.S. PATENT DOCUMENTS

| | | | | |
|---|---|---|---|---|
| 4,699,273 A | * | 10/1987 | Suggi-Liverani | B07C 5/3425 209/580 |
| 4,848,590 A | * | 7/1989 | Kelly | B07C 5/3427 209/564 |
| 5,779,058 A | * | 7/1998 | Satake | B07C 5/368 250/226 |
| 5,791,489 A | * | 8/1998 | Leifeld | D01B 3/025 209/567 |
| 6,100,488 A | * | 8/2000 | Satake | B07C 5/3425 209/580 |
| 7,360,750 B2 | * | 4/2008 | Yano | F16K 31/004 251/129.01 |
| 9,024,223 B2 | * | 5/2015 | Miyamoto | G01N 21/27 209/580 |
| 9,833,815 B2 | * | 12/2017 | Gruna | B07C 5/342 |
| 2009/0050540 A1 | * | 2/2009 | Imai | G01N 21/85 209/580 |
| 2013/0081982 A1 | * | 4/2013 | Tanaka | G01N 21/85 209/552 |

FOREIGN PATENT DOCUMENTS

| | | | |
|---|---|---|---|
| JP | H0641876 U | * | 6/1994 |
| JP | 2000157936 A | * | 6/2000 |
| JP | 3079932 B2 | | 8/2000 |
| JP | 2010042326 A | * | 2/2010 |
| JP | 2013511052 A | * | 3/2013 |
| JP | 2017080732 A | * | 5/2017 |
| JP | 2017-170400 A | | 9/2017 |
| KR | 20150015378 A | * | 2/2015 |
| WO | WO-9818574 A1 | * | 5/1998 ........... B07C 5/3416 |

OTHER PUBLICATIONS

Written Opinion corresponding to International Application No. PCT/JP2021/007376 dated May 11, 2021, Japanese only.
Innternational Preliminary Report on Patentability corresponding to International Application No. PCT/JP2021/007376 dated Sep. 6, 2022, in English.

* cited by examiner

OPTICAL SORTER

This application is a national phase of International Application No. PCT/JP2021/007376 filed Feb. 26, 2021, which claims the priority of Japanese Patent Application JP2020-038196 filed Mar. 5, 2020, all of which are hereby incorporated herein by reference in their entireties.

TECHNICAL FIELD

The present invention relates to an optical sorter.

BACKGROUND

Conventionally, there have been known optical sorters (hereinafter also simply referred to as sorters) that determine whether a sorting target is a foreign object or a defective product using optical information acquired by an optical sensor when irradiating the sorting target in transit with light, thereby removing the foreign object and the defective product. Typically, this type of sorter ejects air toward the sorting target determined to be the foreign object or the defective product to change the trajectory of this sorting target (i.e., change this trajectory to a trajectory different from a sorting target determined to be an acceptable product), thereby removing the foreign object and the defective product.

In the above-described configuration, a position at which the sorting target is imaged by the optical sensor (hereinafter also referred to as an imaging position), and a position at which the trajectory of the sorting target is changed by the air (hereinafter also referred to as a trajectory change position) in the transit route of the sorting target are different from each other. Therefore, the sorter should eject the air at a timing when the sorting target determined to be the foreign object or the defective product is moved from the imaging position to the trajectory change position. In other words, the sorter should change the trajectory by ejecting the air at a timing delayed behind the imaging moment by a predetermined time (a time required for the movement from the imaging position to the trajectory change position). The time from the imaging of the sorting target to the ejection of the air is also referred to as a delayed time.

Conventionally, this delayed time has been set to an optimum value by conducting a test. Such setting work has necessitated trial and error of temporarily setting a large number of delayed times shifted little by little and measuring the sorting accuracy for each of the temporarily set delayed times, thereby having necessitated many man-hours. For such a reason, some attempt has been made to develop a technique capable of determining the delayed time without requiring the trial and error.

For example, the following patent literatures, PTLs 1 and 2 disclose sorters capable of automatically determining the delayed time. More specifically, the sorters discussed in PTLs 1 and 2 include two optical sensors (referred to as a first optical sensor and a second optical sensor for descriptive purposes) that detect light at two points (referred to as a first point and a second point for descriptive purposes) in a transit route of a sorting target, respectively. A transit speed of the sorting target is calculated based on a time since one sorting target is detected at the first point by the first optical sensor until this sorting target is detected at the second point by the second optical sensor. Because the distance between the first point and the second point is known, the transit speed of the sorting target can be easily calculated by dividing the distance between the first point and the second point by the time required for the movement therebetween. The delayed time is determined based on the transit speed of the sorting target acquired in this manner.

CITATION LIST

[PTL 1] Japanese Patent No. 3079932
[PTL 2] Japanese Patent Application Public Disclosure No. 2017-170400

SUMMARY

Technical Problem

However, the techniques discussed in PTLs 1 and 2 raise the necessity of determining whether the sorting target detected at the first point by the first optical sensor and the sorting target detected at the second point by the second optical sensor are the same sorting target. Such a determination about the sameness would be easy if sorting targets are conveyed one by one at sufficient intervals, but a large number of sorting targets having approximately similar shapes are conveyed at the same time in an actual sorter to secure its processing capacity. Under such a situation, the determination about the sameness is extremely difficult, and therefore the transit speed may be incorrectly calculated. The reduction in the accuracy of the calculation of the transit speed results in a reduction in the sorting accuracy.

These circumstances have led to a demand for a sorter capable of further accurately calculating the transit speed of the sorting target.

Solution to Problem

The present invention has been made with the aim of solving the above-described problem, and can be realized as, for example, the following aspects.

According to a first aspect of the present invention, an optical sorter is provided. This optical sorter includes a light source configured to emit light toward a granular sorting target in transit, and a color sensor. The color sensor includes an R element group, which is a plurality of optical elements for detecting light having a wavelength corresponding to red, a G element group, which is a plurality of optical elements for detecting light having a wavelength corresponding to green, and a B element group, which is a plurality of optical elements for detecting light having a wavelength corresponding to blue, and is configured to detect light associated with the sorting target in transit. At least two element groups out of the R element group, the G element group, and the B element group are arranged so as to be spaced apart from each other in a transit direction of the sorting target. The optical sorter further includes a determination part configured to determine a foreign object and/or a defective product with respect to the sorting target based on a signal acquired by the color sensor, a color shift amount calculation part configured to calculate, based on a color image acquired by the color sensor, an amount of a color shift that occurs due to the fact that the at least two element groups are spaced apart from each other in the transit direction of the sorting target, a speed calculation part configured to calculate a transit speed of the sorting target based on a separation distance between the at least two element groups in the transit direction, the color shift amount, and a scan time, which is a time required for the color sensor to scan the sorting target once, and a sorting device configured to perform, at a timing determined based on the transit speed calculated by the speed calculation part, a trajectory change operation for changing a trajectory of a specific sorting target determined based on a result of the determination by the determination part.

According to this optical sorter, the transit speed of the sorting target can be calculated based on the amount of the color shift that occurs due to the fact that the at least two element groups out of the R element group, the G element group, and the B element group are spaced apart from each other in the transit direction of the sorting target. In other words, the transit speed of the sorting target can be calculated using only a single color sensor. This eliminates the necessity of determining whether the sorting targets at the separated two points are the same sorting target, thereby allowing the transit speed of the sorting target to be further accurately calculated.

According to a second aspect of the present invention, in the first aspect, the R element group, the G element group, and the B element group are arranged so as to be spaced apart from each other in the transit direction. The color shift amount calculated by the color shift amount calculation part includes at least one of a color shift amount between an R image acquired via the R element group and a G image acquired via the G element group, a color shift amount between the R image and a B image acquired via the B element group, and a color shift amount between the G image and the B image. According to this aspect, the first aspect can be applied to a three-line sensor or a four-line sensor in which the R element group, the G element group, and the B element group are arranged so as to extend in parallel with and be spaced apart from each other.

According to a third aspect of the present invention, in the second aspect, the color shift amount calculated by the color shift amount calculation part includes the color shift amount between the R image and the G image, the color shift amount between the R image and the B image, and the color shift amount between the G image and the B image. According to this aspect, the color shift amount is calculated between images of more colors and the transit speed is calculated based thereon, and therefore a further average value can be acquired as the transit speed. In other words, the present aspect can make it less likely for a significant error to occur in the calculated transit speed.

According to a fourth aspect of the present invention, in the first aspect, the R element group, the G element group, and the B element group are arranged so as to have a Bayer arrangement. The color shift amount calculated by the color shift amount calculation part is a color shift amount between an R image acquired via the R element group and a B image acquired via the B element group. According to this aspect, the first aspect can be applied to a two-line sensor in which the R element group, the G element group, and the B element group are arranged so as to have a Bayer arrangement.

According to a fifth aspect of the present invention, in any of the first to fourth aspects, the color shift amount calculation part calculates the color shift amount for each grain of the sorting target and/or for each group of grains overlapping in the color image. The speed calculation part calculates the transit speed based on a representative value of a plurality of the color shift amounts calculated by the color shift amount calculation part. According to this aspect, the color shift amount can be accurately calculated, and thus the transit speed can be accurately calculated in which the overall trend of the sorting target indicated in the color image is reflected.

According to a sixth aspect of the present invention, in any of the first to fifth aspects, the determination part determines both the foreign object and the defective product. The color shift amount calculation part extracts, from the color image, a first region which contains a foreign object image region that is an image region indicating the foreign object and does not contain a non-foreign object image region that is an image region indicating the sorting target other than the foreign object, and a second region which does not contain the foreign object image region and contains the non-foreign object image region, and calculates each of a color shift amount of the first region and a color shift amount of the second region. The speed calculation part calculates each of a transit speed of the foreign object and a transit speed of the sorting target other than the foreign object as the transit speed of the sorting target. The specific sorting target includes the foreign object and the defective product. The sorting device performs the trajectory change operation with respect to the foreign object at a timing determined based on the transit speed of the foreign object and also performs the trajectory change operation with respect to the defective product at a timing determined based on the transit speed of the sorting target other than the foreign object. According to this aspect, even when the transit speed is considerably different between the foreign object and the defective product, different transit speeds are calculated for the foreign object and the defective product, and therefore the sorting target can be accurately sorted while the difference between the transit speed of them is reflected therein.

According to a seventh aspect of the present invention, in any of the first to sixth aspects, the speed calculation part calculates the transit speed each time a predetermined event occurs. The sorting device performs the trajectory change operation at a timing determined based on at least the latest transit speed. According to this aspect, each time the predetermined event occurs, the transit speed is updated into a value in which the processing condition at this time is reflected. Therefore, the sorting accuracy can be increased. The above-described timing may be determined based on only the latest transit speed among previously calculated transit speeds or may be determined based on the latest transit speed and at least one transit speed calculated before the latest transit speed is calculated. In the latter case, the above-described timing may be determined based on, for example, a moving average of last transit speeds calculated (for example, a moving average of the latest transit speed, the second latest transit speed, and the third latest transit speed).

According to an eighth aspect of the present invention, in the seventh aspect, the predetermined event includes a start of an operation of the optical sorter. According to this aspect, even when the processing condition (for example, the properties of the sorting target) is changed from when the optical sorter operates previously, the optical sorter can promptly adapt to this change in the processing condition.

According to a ninth aspect of the present invention, in the seventh or eighth aspect, the predetermined event includes continuation of the operation of the optical sorter for a predetermined time. According to this aspect, the optical sorter can further finely adapt to the change in the processing condition. For example, the optical sorter can adapt to even a change in the transit speed due to a change in the supply amount of the sorting target (i.e., the transit amount).

The present invention is not limited to the above-described aspects, and can be embodied in various manners. For example, the present invention can also be embodied in the form of a program that causes a computer to execute a color shift amount calculation function of calculating the color shift amount with respect to the color image acquired by the color sensor and a speed calculation function of calculating the transit speed of the sorting target based on the separation distance between the at least two element groups of the color sensor, the color shift amount, and the scan time, which is the time required for the color sensor to scan the sorting target once, or in the form of a storage medium computer-readably storing this program therein.

DESCRIPTION OF EMBODIMENTS

Figure 1:
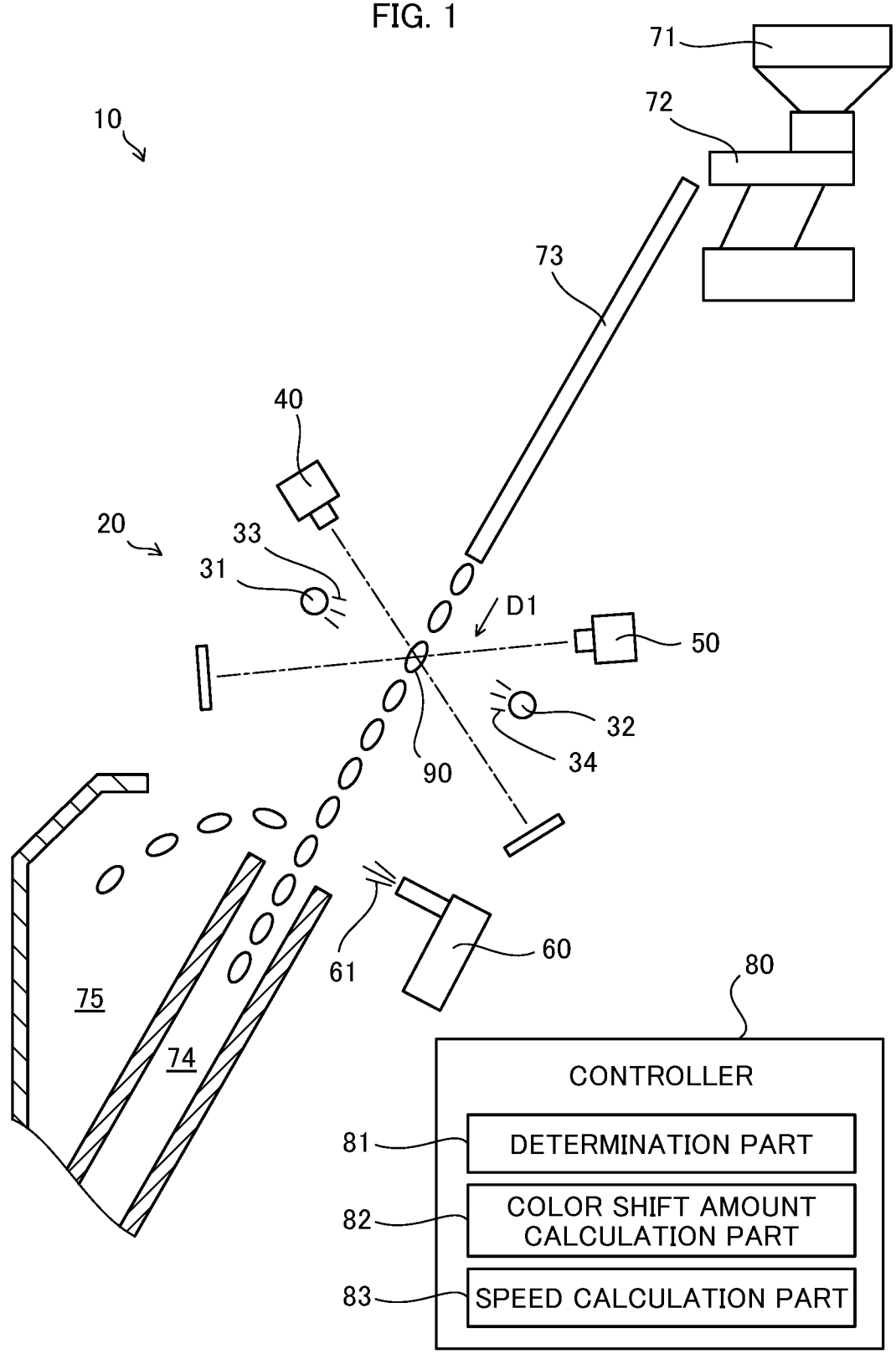
FIG. 1 is a schematic view illustrating an outline of the configuration of an optical sorter according to one embodiment of the present invention.

FIG. 1 is a schematic view illustrating an outline of the configuration of an optical sorter (hereinafter simply referred to as a sorter) 10 according to one embodiment of the present invention. In the present embodiment, the sorter 10 is used to sort a foreign object (for example, a small stone, mud, and a glass piece) and a defective product (for example, an immature grain, a colored grain, a damaged grain, and dead rice) from a rice grain (more specifically, brown rice or milled rice) set as a sorting target (hereinafter simply referred to as a target) 90. However, the target 90 is not limited to the brown rice or the milled rice, and may be any granular object. For example, the target 90 may be unhulled rice, a wheat grain, beans (a soybean, a chickpea, a green soybean, and the like), resin (a pellet and the like), a rubber piece, or the like.

As illustrated in FIG. 1, the sorter 10 includes an optical detection part 20, a storage tank 71, a feeder 72, a chute 73, an acceptable product discharge gutter 74, a defective product discharge gutter 75, a sorting device 60, and a controller 80. The controller 80 controls the overall operation of the sorter 10. The controller 80 also functions as a determination part 81, a color shift amount calculation part 82, and a speed calculation part 83. The functions of the controller 80 may be realized by a CPU executing a predetermined program, may be realized by a dedicated circuit (for example, a PLD or an ASIC), or may be realized by a combination of a CPU and a dedicated circuit. Further, the functions of the controller 80 may be assigned to an integrated single device or may be divided and assigned to a plurality of devices. The details of the functions of the controller 80 will be described below.

The storage tank 71 temporarily stores the target 90 therein. The feeder 72 feeds the target 90 stored in the storage tank 71 onto the chute 73. The optical detection unit 20 irradiates the target 90 sliding down from the chute 73 with light, and detects light associated with the target 90 (more specifically, transmitted light transmitted through the target 90 and/or reflected light reflected by the target 90). An output from the optical detection unit 20, i.e., an analog signal indicating a detected light intensity is converted into a digital signal by an AC/DC converter (not illustrated). This digital signal is input to the controller 80. The controller 80 determines, based on the input light detection result (i.e., an image), whether the target 90 is an acceptable product (i.e., a relatively high-quality rice grain), or a foreign object (i.e., something that is not a rice grain) or a defective product (i.e., a relatively low-quality rice grain) as the processing by the determination part 81. This determination is made with respect to each target 90. Typically, this determination is made by comparing a tone value of image data and a predetermined threshold value. However, any known determination method can be employed for this determination.

The sorting device 60 performs, at a predetermined timing, a trajectory change operation of changing the trajectory of a specific target 90 determined based on the result of the determination by the determination part 81. A method for determining this predetermined timing will be described below. In the present embodiment, the sorting device 60 is in the form of an ejector, and ejects air 61 toward the specific target 90 to thus change the trajectory of this target 90. Further, in the present embodiment, the specific target 90 is the target 90 determined to be the foreign object or the defective product by the determination part 81. Due to the trajectory change operation by the sorting device 60, i.e., the ejection of the air 61, the target 90 determined to be the foreign object or the defective product is blown off, and is deviated from a falling trajectory from the chute 73 to be guided to the defective product discharge gutter 75. On the other hand, if the target 90 is determined to be the acceptable product, the air 61 is not ejected. Therefore, the target 90 determined to be the acceptable product is guided to the acceptable product discharge gutter 74 without changing the falling trajectory thereof. The air 61 may be ejected toward the target 90 determined to be the acceptable product (so-called reverse screening) instead of the configuration that ejects the air 61 toward the target 90 determined to be the foreign object or the defective product. Further, the trajectory change operation is not limited to the ejection of the air 61, and may be realized by employing any other known method.

In the following description, the details of the optical detection unit 20 will be described. As illustrated in FIG. 1, the optical detection unit 20 includes light sources 31 and 32 and color sensors 40 and 50. The light source 31 and the color sensor 40 are disposed on one side (also referred to as a front side) with respect to a transit route of the target 90 (i.e., the falling trajectory from the chute 73). On the other hand, the light source 32 and the color sensor 50 are disposed on the other side (also referred to as a rear side) with respect to the transit route of the target 90.

The light source 31 emits light 33 toward a plurality of targets 90 in transit (i.e., being falling from the chute 73). Similarly, the light source 32 emits light 34 toward the plurality of targets 90 in transit. Each of the light 33 and the light 34 has a wavelength corresponding to red, a wavelength corresponding to green, and a wavelength corresponding to blue. In the present embodiment, the light sources 31 and 32 are so-called color LEDs. However, the light sources 31 and 32 may be any other light emitting elements (for example, halogen lamps). Further, FIG. 1 illustrates the light sources 31 and 32 assuming that the number of light sources is one for each of them, but the number of light sources may be plural for each with respect to at least one of the light sources 31 and 32.

The color sensors 40 and 50 detect the light associated with the target 90 in transit. The color sensor 40 on the front side can detect the light 33 emitted from the light source 31 on the front side and reflected by the target 90 (hereinafter also referred to as the reflected light 33) and the light 34 emitted from the light source 32 on the rear side and transmitted through the target 90 (hereinafter also referred to as the transmitted light 34). The color sensor 50 on the rear side can detect the light 34 emitted from the light source 32 on the rear side and reflected by the target 90 (hereinafter also referred to as the reflected light 34) and the light 33 emitted from the light source 31 on the front side and transmitted through the target 90 (hereinafter also referred to as the transmitted light 33).

What kind of light is detected by the color sensors 40 and 50 is determined based on lighting patterns of the light sources 31 and 32. In a first lighting pattern where the light source 31 and the light source 32 are on all at once, the color sensor 40 detects light acquired by combining the reflected light 33 and the transmitted light 34 (hereinafter also referred to as reflected and transmitted light), and the color sensor 50 detects reflected and transmitted light acquired by combining the reflected light 34 and the transmitted light 33. In a second lighting pattern where the light source 31 is on and the light source 32 is off, the color sensor 40 detects the reflected light 33 and the color sensor 50 detects the transmitted light 33. In a third lighting pattern where the light source 31 is off and the light source 32 is on, the color sensor 40 detects the transmitted light 34 and the color sensor 50 detects the reflected light 34. Which pattern of the first lighting pattern, the second lighting pattern, and the third lighting pattern is employed can be determined in any manner according to the kind and properties of the target 90 and/or the kind of the foreign object or the defective product desired to be removed. Only any one of the first to third lighting patterns may be employed. Alternatively, two or more lighting patterns out of the first to third lighting patterns may appear alternately at predetermined time intervals or according to a predetermined repetition rule.

In the present embodiment, the color sensors 40 and 50 are color CCD sensors. More specifically, each of the color sensors 40 and 50 includes a plurality of optical elements for detecting light having a wavelength corresponding to red (hereinafter referred to as R elements), a plurality of optical elements for detecting light having a wavelength corresponding to green (hereinafter referred to as G elements), and a plurality of optical elements for detecting light having a wavelength corresponding to blue (hereinafter referred to as B elements). R, G, and B indicate R, G, and B in the RGB color space, respectively. Each of these optical elements includes a collective lens, a color filter, and a photoelectric conversion element. Each of the color filters has a characteristic of permitting transmission of light having a wavelength corresponding to the color of the light that should be detected (for example, red for the R element), and prohibiting transmission of light having another wavelength. The color sensors 40 and 50 are not limited to the color CCD sensors, and may be another type of color sensors such as color CMOS sensors.

Figure 2:
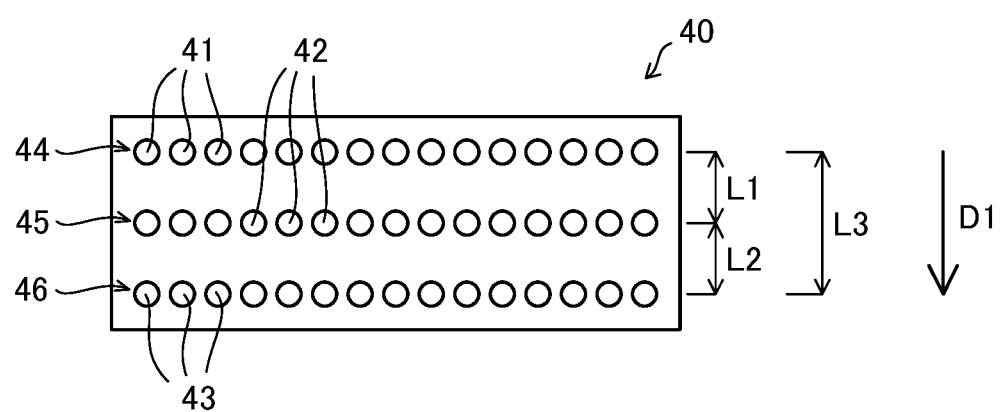
FIG. 2 is a schematic view illustrating the layout of optical elements in a color sensor.

FIG. 2 is a schematic view illustrating the layout of the optical elements in the color sensor 40. As illustrated in FIG. 2, the color sensor 40 includes an R element group 44, in which a plurality of R elements 41 is arranged in one row, a G element group 45, in which a plurality of G elements 42 is arranged in one row, and a B element group 46, in which a plurality of B elements 43 is arranged in one row. All the plurality of R elements 41, the plurality of G elements 42, and the plurality of B elements 43 are each arranged in one row in a direction perpendicular to a transit direction D1 of the target 90. In other words, the R element group 44, the G element group 45, and the B element group 46 are arranged in parallel so as to be spaced apart from each other in the transit direction D1 of the target 90. As clearly seen from this description, the color sensor 40 is a so-called three-line sensor. A separation distance between the R element group 44 and the G element group 45 is L1, a separation distance between the G element group 45 and the B element group 46 is L2, and a separation distance between the R element group 44 and the B element group 46 is L3 (=L1+L2). Normally, L1 and L2 are L1=L2 but may be different values. The color sensor 50 is configured identically to the color sensor 40, and therefore the description thereof will be omitted herein.

Figure 3:
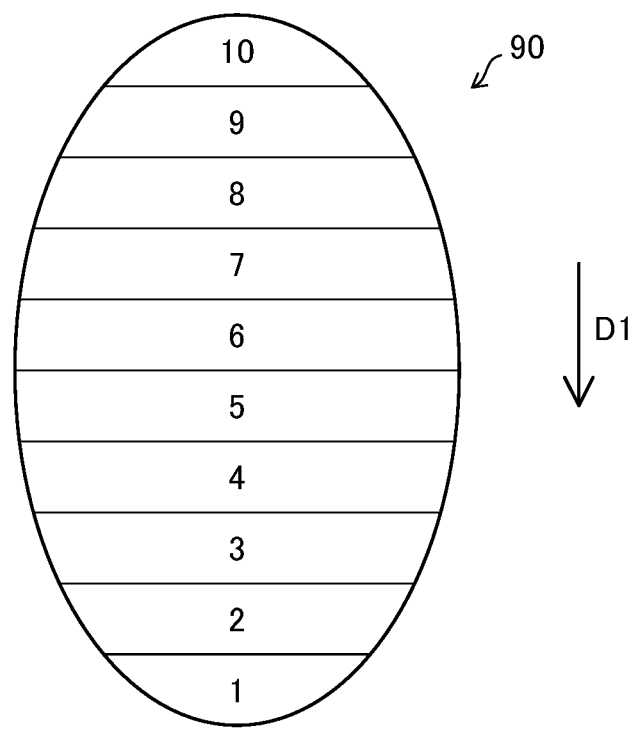
FIG. 3 illustrates an example of a region imaged by scanning one sorting target once.

As widely known, the color sensors 40 and 50 detect the light associated with one target 90 by scanning this target 90 a plurality of times. As illustrated in FIG. 3, in the present embodiment, the image data is acquired by scanning the one target 90 ten times (citing an example supposing that the target 90 is scanned a smaller number of times than the actual number of times for simplification of the description). Numbers 1 to 10 illustrated in FIG. 3 indicate what number scan is used to image the region labeled this number. For example, the region labeled "2" indicates that image data thereof is acquired by the second scan.

In the above-described sorter 10, the controller 80 determines, during the operation, a transit speed of the target 90 (more specifically, a transit speed at the moment when the target 90 is imaged by the color sensor 40 or the color sensor 50). Then, after determining the specific target 90 that should be targeted for the trajectory change operation as the processing by the determination part 81, the controller 80 transmits an instruction to the sorting device 60 and causes the sorting device 60 to perform the trajectory change operation (i.e., the ejection of the air 61) toward the specific target 90 at a timing determined based on the determined transit speed (i.e., with a delayed time determined based on the determined transit speed). In the following description, a method for determining the transit speed for setting the delayed time will be described in detail.

To determine the transit speed, first, the controller 80 calculates a color shift amount with respect to the color image acquired by the color sensor 40 as the processing by the color shift amount calculation part 82. In the color sensor 40, the R element group 44, the G element group 45, and the B element group 46 scan the target 90 at the same time, but, since the R element group 44, the G element group 45, and the B element group 46 are spaced apart from each other in the transit direction D1, strictly speaking, the imaged portion of the target 90 is supposed to be shifted between these colors by an amount corresponding to this separation distance. Therefore, a shift occurs in a direction in the image that corresponds to the transit direction D1 between a red image acquired by the R element group 44, a green image acquired by the G element group 45, and a blue image acquired by the B element group 46. The amount of this color shift is calculated in a unit smaller than one pixel, which is the unit forming the image.

Figure 4:
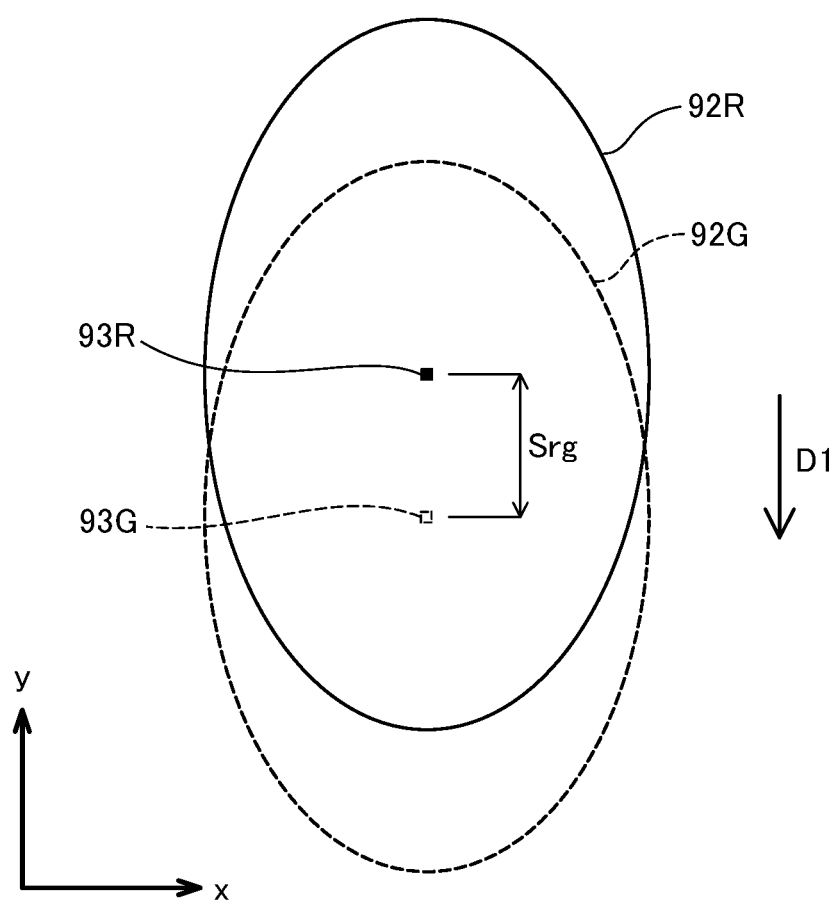
FIG. 4 illustrates one example of a method for calculating a color shift amount.
Figure 5:
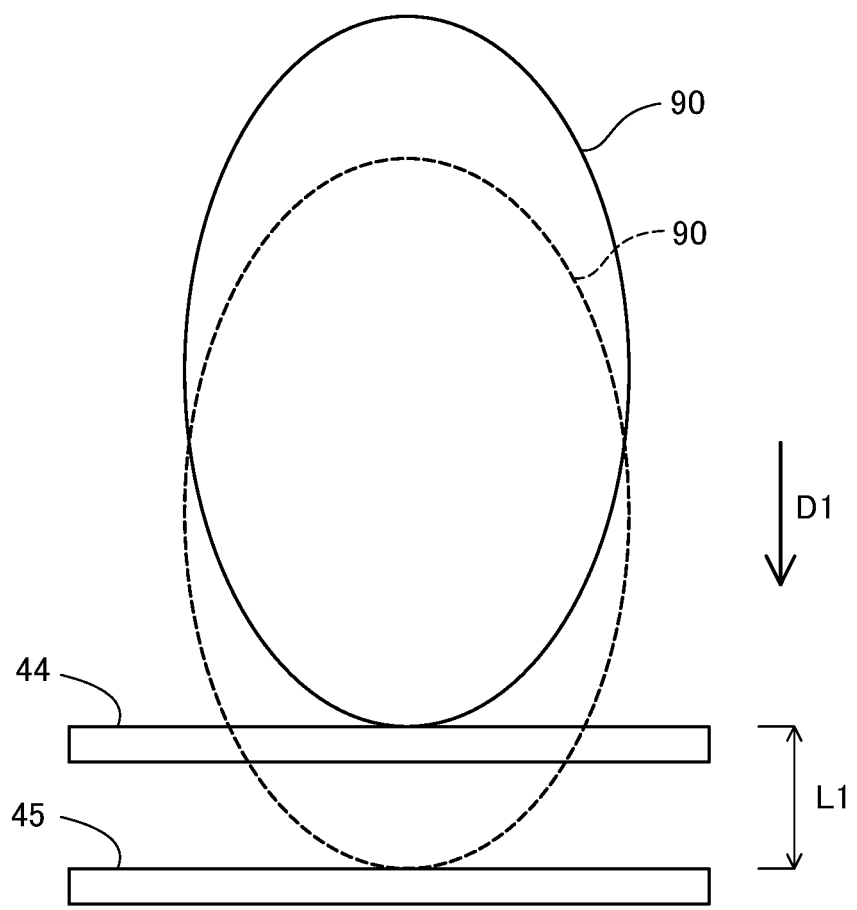
FIG. 5 illustrates one example of a method for calculating a transit speed.

In the present embodiment, the color shift amount calculation part 82 calculates a color shift amount Srg between the red image and the green image, a color shift amount Sgb between the green image and the blue image, and a color shift amount Srb between the red image and the blue image. FIG. 4 illustrates one example of a method for calculating the color shift amount. FIG. 4 illustrates the method assuming that the color shift amount Srg between a red image 92R and a green image 92G is calculated grain by grain that is the target 90. In the calculation of the color shift amount, the color shift amount calculation part 82 first sets common coordinates at a resolution finer than one pixel with respect to each of the red image 92R of one grain of target 90 and the green image 92G of this one grain of target 90. For example, coordinate points may be set in the unit of 1/1000 pixels with respect to each of an x direction (a direction perpendicular to a direction corresponding to the transit direction D1) and a y direction (the direction corresponding to the transit direction D1). In this case, 1000000 (=1000× 1000) coordinate points are allocated to one pixel. This resolution can be set to any value according to the desired accuracy of the calculation of the color shift amount.

Next, the color shift amount calculation part 82 calculates a red density centroid coordinate 93R of the red image 92R and a green density centroid coordinate 93G of the green image 92G based on a color tone value of each coordinate point (the tone values of 100 coordinate points corresponding to one pixel are the same as one another). The density centroid coordinate can be calculated by dividing the sum of the product of the coordinate value and the tone value of each coordinate point by the sum of the tone value of each coordinate point with respect to each of the x coordinate and the y coordinate.

Then, as illustrated in FIG. 4, the color shift amount calculation part 82 acquires a separation distance between the red density centroid coordinate 93R and the green density centroid coordinate 93G in the y direction, i.e., the direction corresponding to the transit direction D1 as the color shift amount Srg (in pixels) between the red image 92R and the green image 92G. However, the calculation of the color shift amount is not limited to the above-described method using the density centroid, and can be made using any known method.

In the present embodiment, the color shift amount is calculated for each grain of target 90 and/or each group of grains overlapping in the color image using such a method. An image region other than image regions indicating the grain of target 90 or the grain group (hereinafter also referred to as a blank region) is excluded from regions targeted for the calculation of the color shift amount. The blank region can be easily removed by binarizing the color image. Calculating the color shift amount grain by grain or grain group by grain group in this manner allows the color shift amount to be accurately calculated. However, the color shift amount calculation part 82 may divide the color image into a plurality of regions (these regions are each sized to allow a plurality of grains to be contained therein) and calculate the color shift amount for each of the plurality of regions.

After calculating the color shift amount Srg between the red image 92R and the green image 92G for each grain and/or for each group of overlapping grains, the color shift amount calculation part 82 calculates a representative value Rrg of a plurality of calculated color shift amounts Srg. Similarly, the color shift amount calculation part 82 calculates a representative value Rgb of a plurality of color shift amounts Sgb and a representative value Rrb of a plurality of color shift amounts Srb. These representative values are average values in the present embodiment, but may be median values or the like.

Next, the controller 80 calculates the transit speed of the target 90 based on the representative values Rrg, Rgb, and Rrb of the color shift amounts Srg, Sgb, and Srb as the processing by the speed calculation part 83. Assuming that a scan time T is a time required for the color sensor 40 to scan the target 90 once, a transit speed Vrg of the target 90 calculated based on the color shift amount Srg between the red image 92R and the green image 92G can be acquired by, for example, the following equation (1). In the equation (1), L1 is L1>0. Further, in the equation (1), the unit of the color shift amount Srg is a unit indicating the distance. For example, the units of the separation distance L1 and the color shift amount Srg are "mm" and the unit of the scan time T is "ms", and the acquired transit speed Vrg is expressed in the unit of "m/s" in this case. In the case where the color shift amount calculation part 82 acquires the color shift amount Srg in "pixels" in the above-described manner, the color shift amount Srg in "mm" can be acquired by multiplying the color shift amount Srg in "pixels" by the pixel size (mm) (i.e., the size per pixel) of the color sensor 40. The transit speed Vrg is not limited to being calculated using the equation (1), and may be calculated by another equation including the color shift amount Srg as a variable, based on an experiment or the like.

$$\mathrm{Vrg}=(L1+\mathrm{Srg})/T \qquad (1)$$

Similarly, the transit speed Vgb of the target 90 calculated based on the color shift amount Sgb can be acquired by the following equation (2), and the transit speed Vrb of the target 90 calculated based on the color shift amount Srb can be acquired by the following equation (3). In the equation (2) and the equation (3), L2 and L3 are L2>0 and L3>0.

$$\mathrm{Vgb}=(L2+\mathrm{Sgb})/T \qquad (2)$$

$$\mathrm{Vrb}=(L3+\mathrm{Srb})/T \qquad (3)$$

In the present embodiment, the above-described representative values Rrg, Rgb, and Rgb are used as the values of Srg, Sgb, and Sgb substituted in the equations (1) to (3), and average transit speeds Vrg, Vgb, and Vgb of the plurality of grains and/or grain groups can be acquired as a result thereof. Then, the speed calculation part 83 determines to use a representative value (an average value in the present embodiment) of the transit speeds Vrg, Vgb, and Vgb as the transit speed for setting the delayed time.

In a case where the light sources 31 and 32 are on according to two or more lighting patterns out of the above-described first to third lighting patterns, the controller 80 may calculate each of the transit speeds based on the image acquired in each of the lighting patterns for each of these two or more lighting patterns, and determine to use a representative value (for example, an average value) of them as the transit speed for setting the delayed time. Alternatively, the controller 80 may calculate the transit speed based on only the image acquired in a part (for example, one lighting pattern) out of the two or more lighting patterns, and determine to use this transit speed as the transit speed for setting the delayed time. In this case, the determined transit speed may be used in common in the two or more lighting patterns.

Further, the color shift amount is calculated only based on the image acquired by the color sensor 40 and the transit speed for setting the delayed time is determined based on this color shift amount in the present embodiment, but the color shift amount may be calculated based on the image acquired by the color sensor 50 instead of or in addition to the image acquired by the color sensor 40. In the case where the color shift amount is calculated based on the image acquired by the color sensor 40 and the image acquired by the color sensor 50, an average value of these two kinds of color shift amounts may be used or an average value of two kinds of transit speeds respectively calculated based on the two kinds of color shift amounts may be used.

One example of the method for setting the delayed time "t" based on the transit speed determined in this manner will be described now with reference to FIG. 6. The transit speed determined by the above-described method is a speed at an imaging position P1. Assume that this speed is an initial speed v0 at this time. Further, assume that θ represents an angle formed by the inclination of the chute 73 with respect to the horizontal direction. Further, assume that the two dimensional coordinates (the coordinates in the horizontal direction and the vertical direction) of the imaging position P1 are set as the origin, and (x, y) represent the coordinates of a trajectory change position P2, which is the position at which the trajectory of the target 90 is changed by the sorting device 60. In this case, the x and y coordinate values are expressed by the following equations (4) and (5) in consideration of the acceleration of gravity. Assume that "g" represents the acceleration of gravity.

$$x = v_0 \cos\theta \cdot t \tag{4}$$

$$y = v_0 \sin\theta \cdot t + \frac{1}{2}gt^2 \tag{5}$$

Then, a distance "d1" between the imaging position P1 and the trajectory change position P2 is expressed by the following equation (6).

$$d1 = \sqrt{x^2 + y^2} \tag{6}$$

Further, assuming that θ1 represents an angle formed between the horizontal direction and a line P1-P2, θ2 represents an angle formed between an air ejection direction (assumed to be perpendicular to the inclination of the chute 73 in the present example) and the horizontal direction, and θ3 represents an angle formed between the air ejection direction and the vertical direction, θ1 to θ3 are expressed by the following equations (7) to (9), respectively.

$$\theta 1 = \arctan\frac{y}{x} (\theta 1 > 0) \tag{7}$$

$$\theta 2 = 90 - \theta \tag{8}$$

$$\theta 3 = 180 - 90 - \theta 2 = 90 - \theta 2 \tag{9}$$

An equation (10) can be acquired from the equations (8) and (9).

$$\theta 3 = 90 - (90 - \theta) = \theta \tag{10}$$

Further, assuming that θ4 represents an angle formed between the air ejection direction and the line P1-P2, θ4 is expressed by the following equation (11).

$$\theta 4 = \theta 3 + (90 - \theta 1)(\theta 4 < 90) \tag{11}$$

An equation (12) can be acquired from the equations (10) and (11).

$$\theta 4 = \theta + (90 - \theta 1) \tag{12}$$

Figure 6:
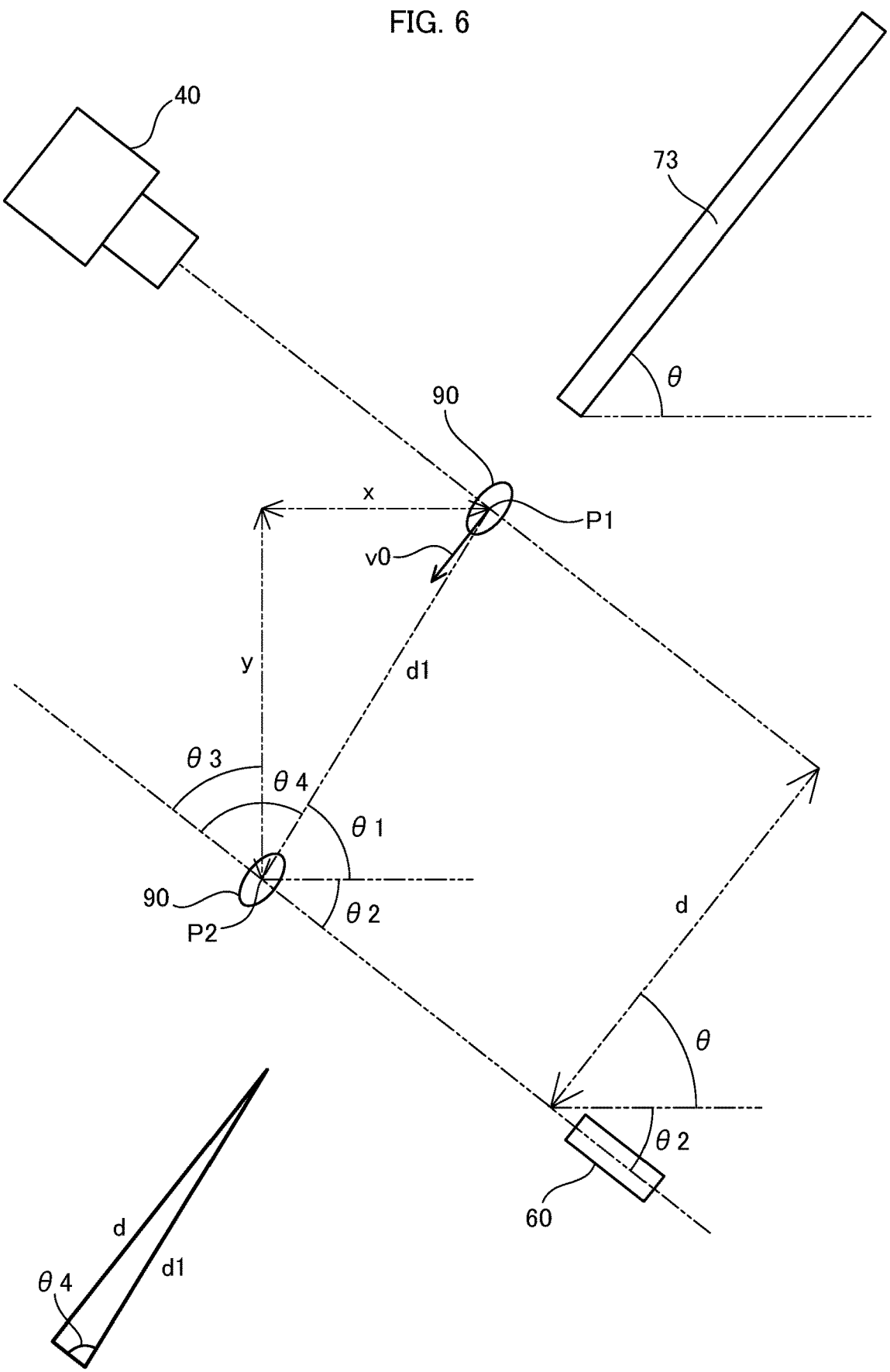
FIG. 6 illustrates one example of a method for calculating a delayed time.

Then, assuming that "d" represents a distance from the imaging position P1 to the position of the sorting device 60 (more specifically, an air ejection position), "d" is expressed by the equation (13) based on the trigonometric relationship illustrated in FIG. 6.

$$d = d1 \sin \theta 4 \tag{13}$$

An equation (14) can be acquired from the equations (6), (7), (12), and (13).

$$d = \sqrt{x^2 + y^2} \sin\left(\theta + \left(90 - \arctan\frac{y}{x}\right)\right) \tag{14}$$

Because "d" and θ are known and "v0" is determined from the processing by the speed calculation part 83, the delayed time "t" can be calculated by finding out "t" that satisfies the equations (4), (5), and (14). The calculated transit speed and/or delayed time is/are stored in a memory of the controller 80.

The above-described method for calculating the delayed time "t" is merely one example, and the delayed time "t" may be set using any method based on the transit speed determined from the processing by the speed calculation part 83. For example, a correction for adding the influence of air resistance may be applied thereto.

According to the above-described sorter 10, the transit speed of the target 90 that is used to set the delayed time is calculated based on the separation distances L1 to L3 in the transit direction D1 between the R element group 44, the G element group 45, and the B element group 46, the amounts of the color shifts between the red image, the green image, and the blue image that occur due to these separation distances L1 to L3, and the scan time, which is the time required for the color sensor 40 and/or the color sensor 50 to scan the target 90 once. This eliminates the necessity of determining whether the targets 90 at separated two points are the same target 90, and therefore the transit speed of the target 90 can be further accurately calculated.

Further, the sorter 10 calculates the transit speed based on the color shift amount Srg between the red image and the green image, the color shift amount Sgb between the green image and the blue image, and the color shift amount Srb between the red image and the blue image, thereby being able to acquire a further average value as the transit speed. In other words, the sorter 10 can make it less likely for a significant error to occur in the calculated transit speed. However, the transit speed may be calculated based on one or two of the color shift amounts Srg, Sgb, and Srb. With the transit speed calculated in this manner, the calculation load on the controller 80 can be reduced.

The above-described determination about the transit speed for setting the delayed time may be made by processing a sample target 90 before the shipment of the sorter 10. Such usage can eliminate the necessity of the trial and error for determining the transit speed, which has been required before the shipment of the sorter 10 conventionally.

Further, the transit speed for setting the delayed time may be determined each time a predetermined event occurs. In this case, the sorter 10 may perform the trajectory change operation at a timing determined based on at least the latest transit speed. The timing "based on at least the latest transit speed" includes a timing based on only the latest transit speed among previously calculated transit speeds, and a timing based on the latest transit speed and at least one transit speed calculated before the latest transit speed is calculated. In the case of the latter, the above-described timing may be determined based on, for example, a moving average of last transit speeds calculated (for example, a moving average of the latest transit speed, the second latest transit speed, and the third latest transit speed). With the transit speed determined in this manner, each time the predetermined event occurs, the transit speed is updated into a value in which the processing condition at this time is reflected, and therefore the sorting accuracy can be increased.

This predetermined event may include a start of the operation of the sorter 10. With the predetermined event set in this manner, even when the processing condition (for example, the properties of the target 90) is changed from when the sorter 10 operates previously, the sorter 10 can promptly adapt to this change in the processing condition. A previously determined transit speed may be used or a transit speed set as a default value may be used during a period since the operation is started until the transit speed is newly determined.

Further, the predetermined event may include continuation of the operation of the sorter 10 for a predetermined time. This predetermined time can be set to any length. The predetermined time may be, for example, one minute or five minutes. With the predetermined event set in this manner, the sorter 10 can further finely adapt to the change in the processing condition. For example, the sorter 10 can update the transit speed in response to a change in the supply amount of the target 90 (i.e., the transit amount).

In the case where the predetermined event includes a plurality of kinds of events, which one is used among a plurality of last transit speeds to determine the timing of the trajectory change operation may be changed according to the kind of the event that occurs. For example, at the time of occurrence of the event that the operation of the sorter 10 is started, the above-described timing may be determined based on only the latest transit speed among previously calculated transit speeds. On the other hand, at the time of occurrence of the event that the sorter 10 continuously operates for a predetermined time, the above-described timing may be determined based on last transit speeds calculated after the operation of the sorter 10 is started (for example, based on a moving average of a predetermined number of transit speeds calculated recently).

Further, the transit speed for setting the delayed time may be determined in real time for each grain and/or for each group of overlapping grains, and the delayed time may be set individually for this each grain and/or for this each group of overlapping grains. In other words, the sorter 10 may determine the transit speed of the specific grain or group of overlapping grains based on the image of this specific grain or group of overlapping grains and set the delayed time based on this transit speed by the time this specific grain of target 90 or group of overlapping grains is conveyed from the imaging position P1 to the trajectory change position P2, and perform the trajectory change operation with respect to this specific grain or group of overlapping grains based on this delayed time. With the trajectory change operation performed in this manner, the sorting accuracy can be further improved.

Further, in the case where the sorter 10 is configured in such a manner that the determination part 81 determines both the foreign object and the defective product and the controller 80 controls the sorting device 60 so as to eject the air toward the foreign object and the defective product, the color shift amount calculation part 82 may determine a different transit speed between the foreign object and the defective product. More specifically, the color shift amount calculation part 82 may extract, from the color image, a first region which contains a foreign object image region that is an image region indicating the foreign object and does not contain a non-foreign object image region that is an image region indicating the target 90 other than the foreign object, and a second region which does not contain the foreign object image region and contains the non-foreign object image region, and calculate each of a color shift amount of the first region and a color shift amount of the second region.

In this case, the speed calculation part 83 calculates each of a transit speed of the foreign object and a transit speed of the target 90 other than the foreign object (i.e., a transit speed of the defective product). Then, the controller 80 controls the sorting device 60 so as to eject the air toward the foreign object at the timing determined based on the transit speed of the foreign object and also eject the air toward the defective product at the timing determined based on the transit speed of the target 90 other than the foreign object. With the sorting device 60 controlled in this manner, even when the transit speed is considerably different between the foreign object and the defective product, the target 90 can be accurately sorted while this difference in the transit speed is reflected therein.

Having described the embodiment of the present invention, the above-described embodiment is intended to only facilitate the understanding of the present invention, and is not intended to limit the present invention thereto. The present invention can be modified or improved without departing from the spirit thereof, and the present invention includes equivalents thereof. Further, each of the elements described in the claims and the specification can be combined in any manner or omitted in any manner within a range that allows it to remain capable of achieving at least a part of the above-described objects or bringing about at least a part of the above-described advantageous effects.

For example, the color sensors 40 and 50 may be any color sensors in which at least two element groups out of the R element group, the G element group, and the B element group are arranged so as to be spaced apart from each other in the transit direction D1 instead of the above-described three-line sensors. For example, the color sensors 40 and 50 may be four-line sensors including a monochrome element group formed by a plurality of elements unequipped with a color filter in addition to the R element group, the G element group, and the B element group. In this case, the transit speed can also be determined using at least two of the red image, the green image, and the blue image acquired from the R element group, the G element group, and the B element group similarly to the above-described embodiment. Alternatively, the color sensors 40 and 50 may be color sensors having a Bayer arrangement. In this case, the transit speed can be determined based on the color shift amount between the red image and the blue image acquired from the R element group and the B element group.

DESCRIPTION OF MUMERALS 10 optical sorter
20 optical detection unit
31, 32 light source
33, 34 light
40, 50 color sensor
41 R element
42 G element
43 B element
44 R element group
45 G element group
46 B element group
50 color sensor
60 sorting device
61 air
71 storage tank
72 feeder
73 chute
74 acceptable product discharge gutter
75 defective product discharge gutter 80 controller
81 determination part
82 color shift amount calculation part
83 speed calculation part
90 target
92R red image
92G green image
93R red density centroid coordinate
93G green density centroid coordinate

The invention claimed is:

1. An optical sorter comprising:
a light source configured to emit light toward a granular sorting target in transit;
a color sensor including an R element group, which is a plurality of optical elements for detecting light having a wavelength corresponding to red, a G element group, which is a plurality of optical elements for detecting light having a wavelength corresponding to green, and a B element group, which is a plurality of optical elements for detecting light having a wavelength corresponding to blue, the color sensor being configured to detect light associated with the sorting target in transit, at least two element groups out of the R element group, the G element group, and the B element group being arranged so as to be spaced apart from each other in a transit direction of the sorting target;
a determination part configured to determine a foreign object and/or a defective product with respect to the sorting target based on a signal acquired by the color sensor;
a color shift amount calculation part configured to calculate, based on a color image acquired by the color sensor, an amount of a color shift that occurs due to the fact that the at least two element groups are spaced apart from each other in the transit direction of the sorting target;
a speed calculation part configured to calculate a transit speed of the sorting target based on a separation distance between the at least two element groups in the transit direction, the color shift amount, and a scan time, which is a time required for the color sensor to scan the sorting target once; and
a sorting device configured to perform a trajectory change operation for changing a trajectory of a specific sorting target determined based on a result of the determination by the determination part at a timing determined based on the transit speed calculated by the speed calculation part.

2. The optical sorter according to claim 1, wherein the R element group, the G element group, and the B element group are arranged so as to be spaced apart from each other in the transit direction, and
the color shift amount calculated by the color shift amount calculation part includes at least one of
a color shift amount between an R image acquired via the R element group and a G image acquired via the G element group,
a color shift amount between the R image and a B image acquired via the B element group, and
a color shift amount between the G image and the B image.

3. The optical sorter according to claim 2, wherein the color shift amount calculated by the color shift amount calculation part includes the color shift amount between the R image and the G image, the color shift amount between the R image and the B image, and the color shift amount between the G image and the B image.

4. The optical sorter according to claim 1, wherein the R element group, the G element group, and the B element group are arranged so as to have a Bayer arrangement, and
the color shift amount calculated by the color shift amount calculation part is a color shift amount between an R image acquired via the R element group and a B image acquired via the B element group.

5. The optical sorter according to claim 1, wherein the color shift amount calculation part is configured to calculate the color shift amount for each grain of the sorting target and/or for each group of grains overlapping in the color image, and
the speed calculation part is configured to calculate the transit speed based on a representative value of a plurality of the color shift amounts calculated by the color shift amount calculation part.

6. The optical sorter according to claim 1, wherein the determination part is configured to determine both the foreign object and the defective product,
the color shift amount calculation part is configured to:
extract, from the color image, a first region which contains a foreign object image region that is an image region indicating the foreign object and does not contain a non-foreign object image region that is an image region indicating the sorting target other than the foreign object, and a second region which does not contain the foreign object image region and contains the non-foreign object image region; and
calculate each of a color shift amount of the first region and a color shift amount of the second region,
the speed calculation part is configured to calculate each of a transit speed of the foreign object and a transit speed of the sorting target other than the foreign object as the transit speed of the sorting target,
the specific sorting target includes the foreign object and the defective product, and
the sorting device is configured to perform the trajectory change operation with respect to the foreign object at a timing determined based on the transit speed of the foreign object and perform the trajectory change operation with respect to the defective product at a timing determined based on the transit speed of the sorting target other than the foreign object.

7. The optical sorter according to claim 1, wherein the speed calculation part is configured to calculate the transit speed each time a predetermined event occurs, and
the sorting device is configured to perform the trajectory change operation at a timing determined based on at least the latest transit speed.

8. The optical sorter according to claim 7, wherein the predetermined event includes a start of an operation of the optical sorter.

9. The optical sorter according to claim 7, wherein the predetermined event includes continuation of the operation of the optical sorter for a predetermined time.

* * * * *